(12) United States Patent
Heyring

(10) Patent No.: US 6,588,777 B1
(45) Date of Patent: Jul. 8, 2003

(54) AXLE ASSEMBLY

(75) Inventor: Christopher Brian Heyring, Eagle Bay (AU)

(73) Assignee: Kinetic Limited, Dunsborough (AU)

( * ) Notice: Subject to any disclaimer, the term of this patent is extended or adjusted under 35 U.S.C. 154(b) by 0 days.

(21) Appl. No.: 09/762,564

(22) PCT Filed: Aug. 10, 1999

(86) PCT No.: PCT/AU99/00643

§ 371 (c)(1),
(2), (4) Date: Apr. 23, 2001

(87) PCT Pub. No.: WO00/09350

PCT Pub. Date: Feb. 24, 2000

(30) Foreign Application Priority Data

Aug. 10, 1998 (AU) .............................................. PP 5126

(51) Int. Cl.[7] .............................................. B60G 21/05
(52) U.S. Cl. ............................ 280/124.106; 280/5.508; 280/124.112
(58) Field of Search .................... 280/124.111, 124.106, 280/124.112, 124.128, 5.508, FOR 146, FOR 166, FOR 159, 5.507

(56) References Cited

FOREIGN PATENT DOCUMENTS

| AT | 218887 | * | 12/1961 |
|---|---|---|---|
| DE | 2627665 | * | 12/1977 |
| EP | 83217 | * | 7/1983 |
| GB | A2284184 | | 5/1995 |
| GB | A2304652 | | 3/1997 |
| JP | 1-103526 | * | 4/1989 |
| WO | 9706971 | | 2/1997 |
| WO | A1-9828160 | | 7/1998 |

* cited by examiner

Primary Examiner—Eric Culbreth
(74) Attorney, Agent, or Firm—Harness, Dickey & Pierce, PLC

(57) ABSTRACT

An axle assembly for a suspension system of a vehicle includes an elongate axle member adapted to rotatably receive wheels of a vehicle, a first arm member operatively associated with the axle member and flexibly connected, in use, to a chassis of the vehicle, a second arm member operatively associated with the axle member and flexibly connected, in use, to the chassis, and a first ram operatively associated with the first arm member and the axle member. The axle assembly is incorporated, in use, into a suspension system as a roll control component of the suspension system. The arrangement is such that when expansion or contraction of the ram is restricted, rotation of the axle member relative to the first arm member is restricted and roll of the vehicle is resisted, and when expansion or contraction of the ram is permitted, rotation of the axle member relative to the first arm member is permitted and articulation of the axle member is permitted.

12 Claims, 4 Drawing Sheets

AXLE ASSEMBLY

This application is the national phase under 35 U.S.C. §371 of PCT International Application No. PCT/AU99/00643 which has an International filing date of Aug. 10, 1999, which designated the United States of America.

The present invention relates to an axle assembly for a vehicle suspension system. In vehicle suspension systems, it is often desirable to provide a relatively high roll stiffness so that the attitude of the vehicle remains relatively stable during cornering, and a relatively low articulation stiffness so that as the vehicle traverses uneven terrain wheels of the vehicle are permitted to articulate and thereby substantially maintain equal loading on the wheels. This is especially important for vehicles which have high roll moments, such vehicles including most all-wheel drive off-road vehicles and all trucks. It is common to provide each set of wheels of a truck with a suspension system which includes an axle assembly having an elongate axle member extending substantially transversely of the truck and at least two elongate trailing arms connected at their ends to respective spaced locations on the axle member so as to form a substantially C shaped rigid member. In use, ends of the trailing arms remote from the axle member are flexibly connected to an underside portion of a chassis of the truck and a pair of wheels are rotatably mounted on the axle member. The purpose of such a suspension system is to provide each axle member of the truck with a relatively high roll stiffness, roll of the vehicle being resisted by virtue of the torsional and bending resistance of the axle member and the trailing arms.

Although the above described suspension system operates satisfactorily in reducing roll of the vehicle, a consequence of rigidly coupling together the trailing arms and the axle member is that they provide resistance to all rotations of the axle member about a longitudinal axis of the vehicle body. This prevents the cross-axle articulation stiffness of the vehicle axle members from being decoupled from the high roll stiffness provided by the axle members and their corresponding trailing arms. In addition, where the road surface is uneven, unnecessarily high wheel loads are generated which cause degradation of the road surface.

The present invention seeks, among other things, to overcome the above mentioned disadvantages.

In accordance with an alternative aspect of the present invention, there is provided an axle assembly for a suspension system of a vehicle, said assembly including an elongate axle member adapted to rotatably receive wheels of a vehicle, a first arm member operatively associated with said axle member and flexibly connected, in use, to a chassis of said vehicle, a second arm member operatively associated with said axle member and flexibly connected, in use, to a chassis of said vehicle, and first ram means operatively associated with the first arm member and said axle member, the arrangement being such that when expansion or contraction of the first ram means is restricted, rotation of said axle member relative to the first arm member is restricted, and when expansion or contraction of the first ram means is permitted, rotation of said axle member relative to the first arm member is permitted.

In this way, by controlling the freedom of movement of the first and second ends of the ram means towards or away from each other, the desired roll stiffness and articulation stiffness can be obtained.

In accordance with an aspect of the present invention, there is provided an axle assembly for a suspension system of a vehicle, said assembly including an elongate axle member adapted to rotatably receive wheels of a vehicle, a first arm member operatively associated with said axle member and flexibly connected, in use, to a chassis of said vehicle, and first ram means operatively associated with the first arm member and said axle member, the arrangement being such that when expansion or contraction of the first ram means is restricted, rotation of said axle member relative to the first arm member is restricted, and when expansion or contraction of the first ram means is permitted, rotation of said axle member relative to the first arm member is permitted.

In accordance with a further alternative aspect of the present invention, there is provided a suspension system including a first vehicle support means including an axle assembly as described above in relation to an aspect of the present invention, and a second vehicle support means having third ram means, said third ram means being operatively associated with at least said first ram means and said second vehicle support means being configured such that the first vehicle support means and the second vehicle support means cooperate with each other so that roll of said vehicle is resisted and articulation of said vehicle is substantially permitted.

In accordance with a further alternative aspect of the present invention, there is provided a vehicle including an axle assembly as described above in relation to an aspect of the present invention.

Figure 1:
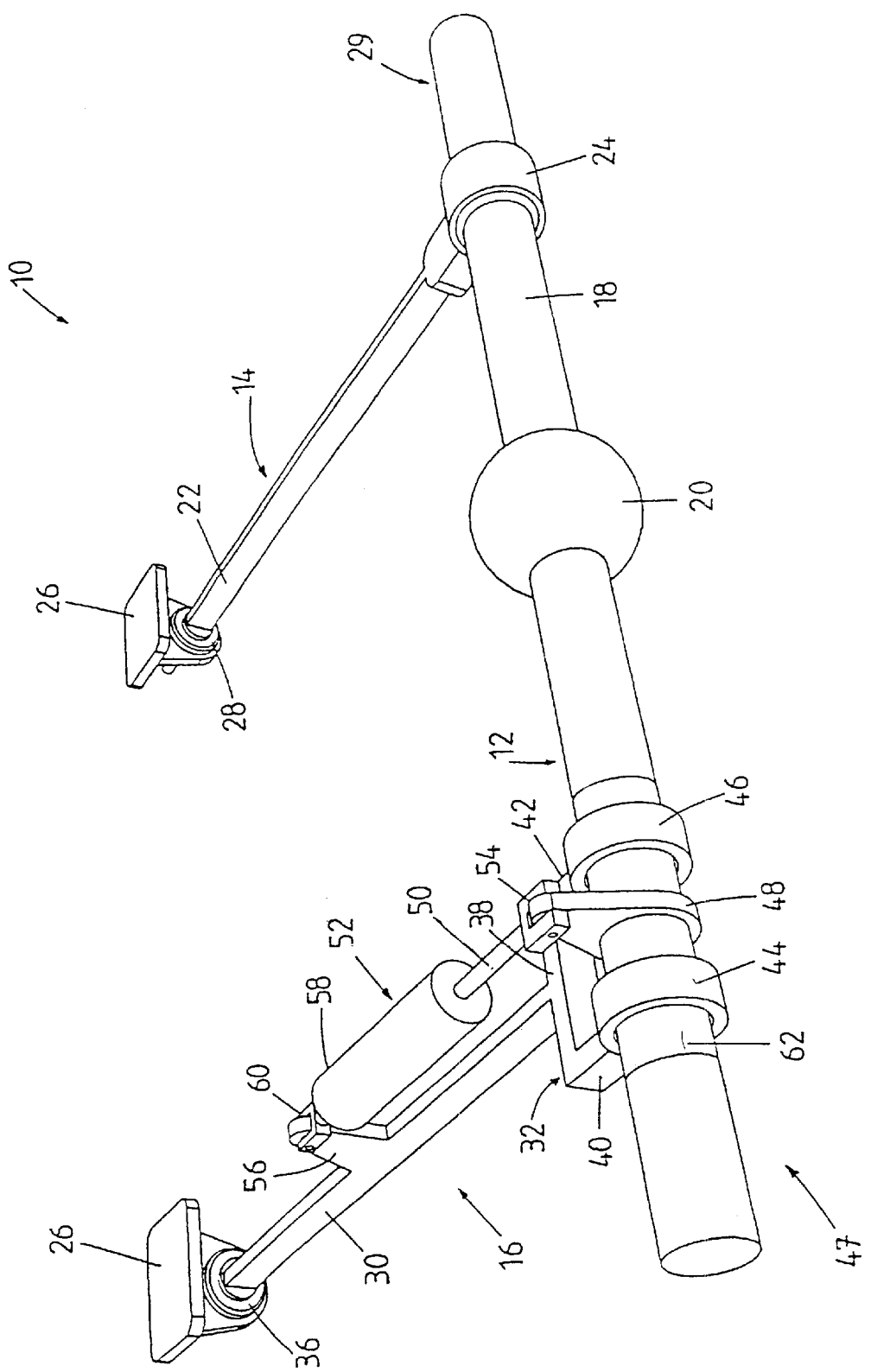
FIG. 1 is a diagrammatic perspective view of an axle assembly in accordance with an embodiment of the present invention.

In FIG. 1, there is shown a first embodiment of an axle assembly 10 for a vehicle suspension system, the assembly 10 having an axle member in the form of an elongate axle casing 12, a first trailing arm 14 and a second trailing arm 16.

The elongate axle casing 12 includes an elongate tubular member 18 which is adapted to rotatably receive at each longitudinal end an axle of a vehicle, each axle being provided with at least one wheel (not shown), and a substantially spherical portion 20 located intermediate longitudinal ends of the tubular member 18. The spherical portion 20 is provided with differential means (not shown) adapted to engage with a drive shaft of the vehicle so as to transfer a drive force from the drive shaft to the axles.

The first trailing arm 14 includes an elongate first arm member 22 and a collar member 24 connected to a longitudinal end of the first arm member 22. An opposite longitudinal end of the first arm member 22 is connected to a chassis portion 26 of a vehicle by a first flexible connection 28. A first end portion 29 of the tubular member, 18 is received in the collar member 24, and the tubular member, 18 and the collar member 24 are fixed to each other by any suitable fixing means, for example by welding or clamping in a known manner.

The second trailing arm 16 includes an elongate second arm member 30 and a forked portion 32 integral with a longitudinal end of the second arm member 30. An opposite longitudinal end of the second arm member 30 is connected to the chassis portion 26 by a second flexible connection 36.

It will be understood that each of the first and second flexible connections 28, 36 is configured so as to permit movement of the first and second arm members about three mutually orthogonal axes.

The forked portion 32 includes a cross member 38 extending in a direction substantially perpendicular to the second arm member 30, a first fork member 40 extending from an end of the cross member 38 in a direction away from and parallel to the second arm member 30 and a second fork member 42 extending from an opposite end of the cross member 38 in a direction away from and parallel to the second arm member 30. Ends of the first and second fork members 40, 42 remote from the cross member 38 are connected to first and second cylindrical bearings 44 and 46 respectively. A second end portion 47 of the tubular member 18 is received in the first and second cylindrical bearings 44, 46 so that the tubular member 18 is rotatable relative to the second trailing arm 16.

The tubular member 18 is also provided with a lever member 48 which extends from an outer surface of the tubular member 18, the lever member 48 being pivotably connected at a location remote from the tubular member 18 to a first end 50 of a hydraulic ram 52 at a first pivot connection 54. The lever member 48 may be fixed to the axle casing 12 by any suitable fixing means, for example by welding or by fixing the lever member to a flange welded onto the axle casing. The second trailing arm 16 is also provided with an upstanding portion 56 extending from the second arm member 30, a portion of the upstanding portion remote from the second arm member 30 being pivotably connected to a second end 58 of the hydraulic ram 52 at a second pivot connection 60. In this example, the first end 50 is a shaft of a piston of the hydraulic ram 52 and the second end 58 is a cylinder portion of the hydraulic ram 52. However, it will be appreciated that the first end could equally be a cylinder portion of the ram and the second end could equally be a shaft of a piston of the ram.

In use, the first and second arm members 22, 30 are fixed to the chassis portion 26 such that the tubular member 18 extends substantially transversely of the vehicle, and axles (not shown) of the vehicle are rotatably received in the tubular member 18. To further support the axle casing 12 relative to the chassis, a Panhard rod may be provided intermediate the axle casing 12 and the chassis to provide lateral location and one or more upper trailing arms (anti-tramp bars) may be provided to help resist braking and acceleration loads.

In use, the axle assembly 10 is incorporated into a suspension system of the type including control means (not shown) for controlling operation of the suspension system. The control means may be adapted to control movement of the first and second ends 50, 58 of the hydraulic ram 52 towards or away from each other so as to thereby obtain the desired degree of roll stiffness and articulation stiffness for a given situation.

In a preferred embodiment the control means operates as follows.

When a vehicle provided with the axle assembly 10 travels in a straight line across uneven terrain, the first end 50 of the hydraulic ram 52 is permitted by virtue of the control means to move towards or away from the second end 58 of the hydraulic ram 52. The effect of this is to permit movement of the lever member 48 towards or away from the cross member 38 and thereby permit rotation of the axle casing 12 relative to the second trailing arm 16. In this way, the axle casing 12 of the vehicle is provided with a relatively low articulation stiffness and a reduced single wheel input, and good contact is thereby maintained between wheels of the vehicle located on the axles and the ground.

When the vehicle travels around a corner across even terrain, the first end 50 is restrained by virtue of the control means from moving towards or away from the second end 58. The effect of this is to restrict movement of the lever member 48 towards or away from the cross member 38 and thereby restrict rotation of the axle casing 12 relative to the second trailing arm 16. In this way, the first and second trailing arms 14, 16 and the tubular member 18 are effectively coupled to each other and the axle is provided with a relatively high roll stiffness.

When the vehicle travels around a corner across uneven terrain, the control means acts to generate roll stiffness whilst at the same time permitting the first end 50 to move relative to the second end 58 during articulation of the axle casing.

Figure 2:
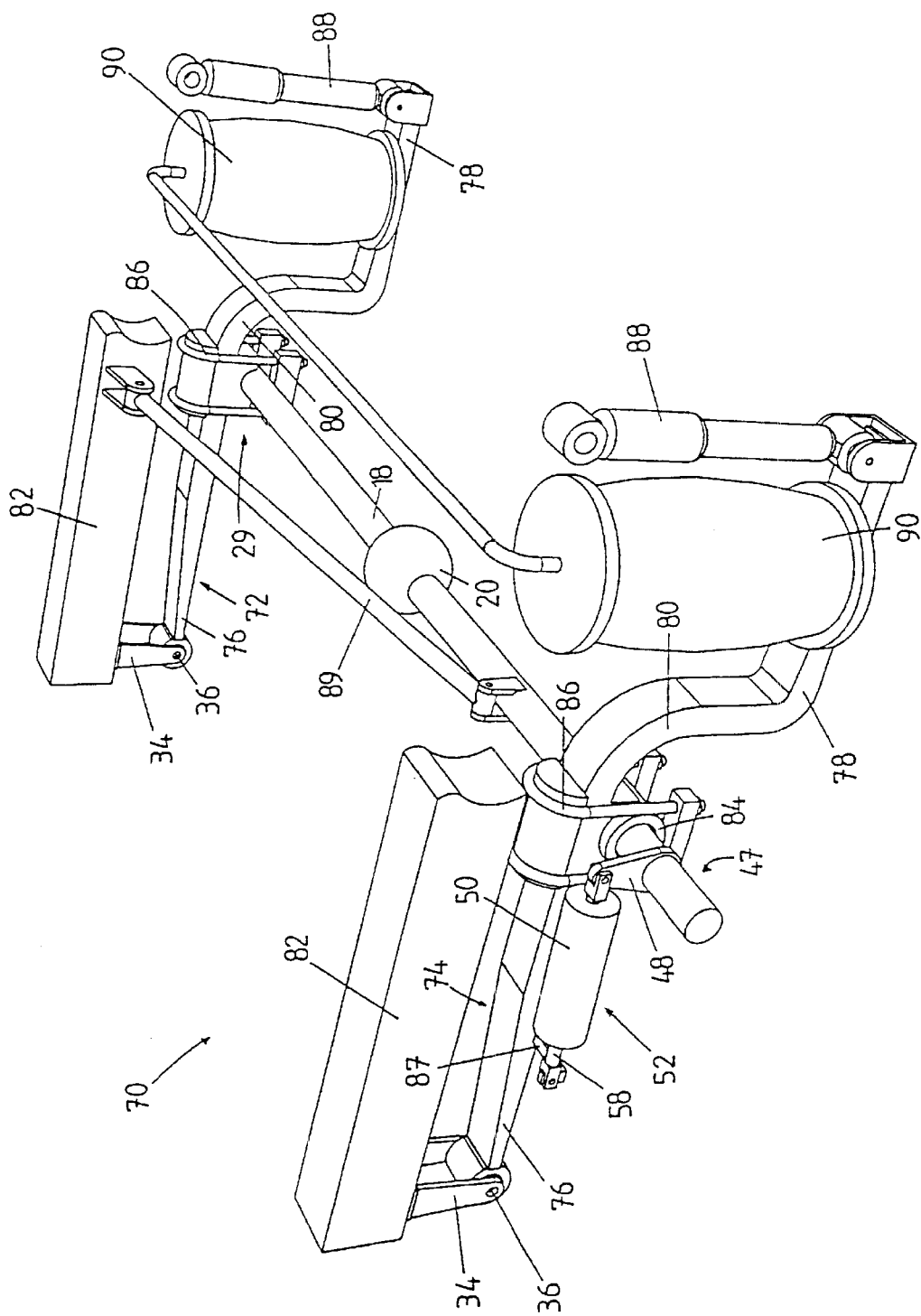
FIG. 2 is a diagrammatic perspective view of an axle assembly in accordance with a further embodiment of the present invention.

A second embodiment of an axle assembly 70 is shown in FIG. 2. Like features have been indicated with like reference numerals.

The axle assembly 70 includes alternative first and second trailing arms 72 and 74 respectively, each trailing arm 72, 74 including a first elongate arm portion 76, a second elongate arm portion 78 and a shoulder portion 80 located intermediate the first and second arm portions 76, 78. A longitudinal end of each first arm portion 76 remote from the shoulder portion 80 is pivotably connected to a chassis 82 of a vehicle at a pivot connection 36.

A single bearing 84 is provided on the tubular member 18 and the first and second trailing arms 72, 74 are fixed to the tubular member 18 and the bearing 84 respectively by clamps 86. The hydraulic ram 52 extends between the lever arm 48 and an upstanding portion 87 extending in a lateral direction from the first arm portion 76 of the second trailing arm 74.

The axle assembly 70 also includes a Panhard rod 89 extending between the tubular member 18 and the chassis 82.

It will be understood that in this embodiment the first end 50 is a cylinder portion of the hydraulic ram 52 and the second end 58 is a shaft of a piston of the hydraulic ram.

Additional support and damping means 88, 90 may be provided on the second arm portions 78 or intermediate the second arm portions 78 and the chassis 82 of the vehicle to further assist in providing the associated wheels with generally equal loadings and also to provide a more comfortable ride.

It will be appreciated that the axle assembly 10, 70 shown in FIGS. 1 and 2 may alternatively include two second trailing arms 16, 74 and corresponding first and second hydraulic rams respectively instead of a first trailing arm 14, 72 and a second trailing arm 16, 74. In this case, appropriate control means would be provided in the suspension system to control operation of the first and second hydraulic rams and achieve the desired roll stiffness and articulation stiffness for a given situation.

Figure 3:
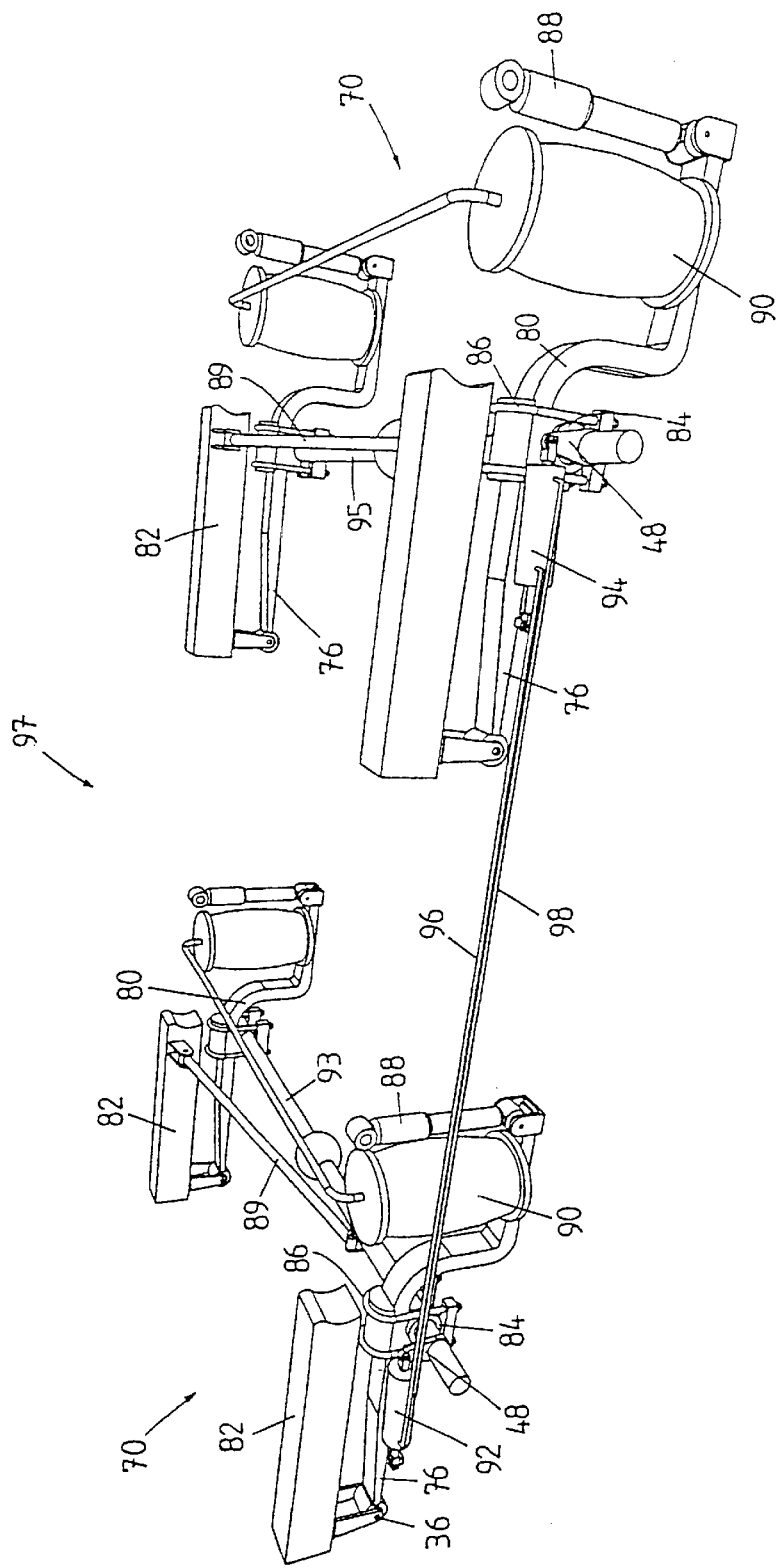
FIG. 3 is a diagrammatic perspective view of a portion of a vehicle suspension system including the axle assembly of FIG. 7.

In a preferred embodiment, the control means is configured to operate a first hydraulic ram 92 of a first axle assembly 70 which is operatively connected to a second hydraulic ram 94 of a second axle assembly 70 as shown in FIG. 3.

With reference to FIG. 3, there is shown a portion 97 of a vehicle suspension system including first and second axle assemblies 70 of the type shown in FIG. 2. The first and second axle assemblies 70 form part of first and second vehicle support means respectively. However, it will be appreciated that other second vehicle support means which include an axle assembly having a similar operation to the second axle assembly are envisaged. Like features have been indicated with like reference numerals.

With this type of control means, each of the first 92 and second 94 hydraulic rams may be a double acting hydraulic ram having a first chamber and a second chamber separated from each other by a piston head. A first conduit 96 is provided to connect the first chamber of the first hydraulic ram 92 to the first chamber of the second hydraulic ram 94, and a second conduit 98 is provided to connect the second chamber of the first hydraulic ram 92 to the second chamber of the second hydraulic ram 94. By connecting the first and second chambers of the first and second hydraulic rams 92, 94 in this way, during roll of the vehicle, the respective fluid pressures generated by the pistons of the hydraulic rams are substantially equalised and simultaneous movement of the pistons of the rams towards their respective cylinders is restrained. When the vehicle travels in a straight line across uneven terrain, the pistons act to circulate fluid in the same direction through the conduits 96, 98 and the pistons move simultaneously in opposite directions relative to their respective cylinders. When the vehicle experiences roll whilst also traversing uneven terrain, both functions operate and the control mechanism acts to generate roll resistance whilst still allowing a degree of articulation. This arrangement provides passive control which acts to cause the vehicle to resist roll and simultaneously permit cross-axle articulation.

It will be appreciated that a similar operation could be achieved by using two single acting rams in place of each double acting ram.

Alternatively, the control means could include sensing means in operative communication with the hydraulic rams so that when an articulation condition is sensed, movement of the pistons of the first and second hydraulic rams in opposite directions relative to their respective cylinders is permitted, and when a roll condition is sensed, movement of the pistons of the first and second hydraulic rams in the same direction relative to their respective cylinders is restricted.

Although this embodiment is described in relation to an axle member having a spherical portion provided with differential means, it will be appreciated that the invention is equally applicable to other axle members which do not include means for driving axles located in the axle casings, such axle members including dead beam axles having wheels rotatably mounted on an outer surface of the axle member.

It will be appreciated that the collar member 24 and the first and second cylindrical bearings 44, 46 or the single bearing 84 may be configured so as to each include at least two separable bearing portions, the at least two bearing portions being clamped together and to the axle casing 12 by any suitable clamping means. In this way, the axle casing 12 is more readily disconnectable from the first and second trailing arms for servicing.

It will also be appreciated that the axle casing 12 may include means for strengthening the axle casing in the region of the cylindrical bearings and/or the collar member, such strengthening means including, for example, a cylindrical sheath as shown at 62 in FIG. 1.

Figure 4:
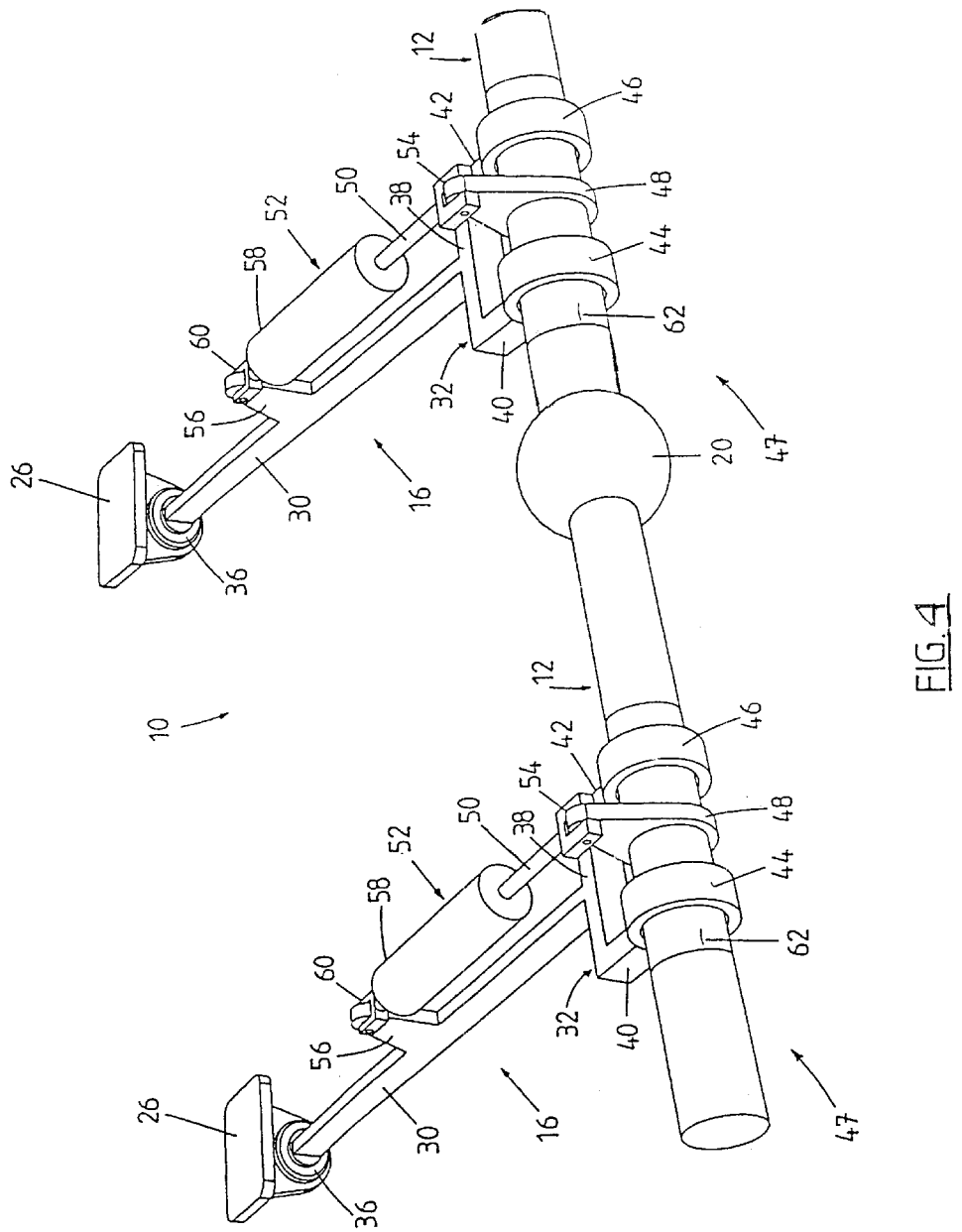
FIG. 4 is a diagrammatic perspective view of an axle assembly in accordance with a further embodiment of the present invention.

FIG. 4 illustrates an axle assembly 10' which includes a hydraulic ram 52 located on both of first and second trailing arms 14 and 16.

It will also be appreciated that although the above example has been described in relation to a substantially cylindrical axle member, other cross-sectional shaped axle members are envisaged, for example I-section axle members.

Modifications and variations as would be apparent to a skilled addressee are deemed to be within the scope of the present invention.

What is claimed is:

1. An axle assembly for a vehicle, said axle assembly comprising:

an elongate axle member defining an axis, said elongate axle member being adapted to ratatably support wheel of said vehicle for rotation about said axis;

a first arm member connected to said axle member and adapted to be flexibly connected to said vehicle, said axle member being rotatably supported by said first arm member for rotation about said axis;

a second arm member connected to said axle member and adapted to be flexibly connected to said vehicle;

a first ram dispose between said first arm member and said axle member, said first ram being movable between a compressed length and an extended length, said extended length being greater than said compressed length of said first ram, rotation of said axle member about said axis occurring during movement of said first ram between its compressed length and its extended length, rotation of said axle member being prohibited when said first ram member is prohibited from moving between its compressed length and its extended length.

2. The axle assembly according to claim 1 wherein said axle member is rotatably supported by said second arm member for rotation about said axis; said axle assembly further comprising:

a second ram disposed between said second arm member and said axle member, said second ram being movable between a compressed length and an extended length, said extended length being greater than said compressed length of said second ram, rotation of said axle member about said axis occurring during movement of said second ram between its compressed length and its extended length, rotation of said axle member being prohibited when said second ram member is prohibited from moving between its compressed length and its extended length.

3. The axle assembly according to claim 1 wherein said second arm member is fixedly secured to said axle member.

4. The axle assembly according to claim 1 wherein said first ram member is a double acting hydraulic ram.

5. An axle assembly for a vehicle, said axle assembly comprising:

an elongate axle member defining an axis, said elongate axle member being adapted to ratatably support wheel of said vehicle for rotation about said axis;

a first arm member connected to said axle member and adapted to be flexibly connected to said vehicle, said axle member being rotatably supported by said first arm member for rotation about said axis;

a first ram dispose between said first arm member and said axle member, said first ram being movable between a compressed length and an extended length, said extended length being greater than said compressed length of said first ram, rotation of said axle member about said axis occurring during movement of said first ram between its compressed length and its extended length, rotation of said axle member being prohibited when said first ram member is prohibited from moving between its compressed length and its extended length.

6. The axle assembly according to claim 5 wherein said first ram is pivotably connected to said first arm member and pivotably connected to said axle member.

7. The axle assembly according to claim 6 further comprising at least one cylindrical bearing disposed between said first arm member and said axle member.

8. The axle assembly according to claim 1 further comprising at least one cylindrical bearing disposed between said first arm member and said axle member.

9. The axle assembly according to claim 1 further comprising a flexible connection attached to said fist arm member, said flexible connection being adapted to attach to said vehicle to permit movement of said first arm member about three mutually orthogonal axes.

10. The axel assembly according to claim 1 further comprising a lever member fixedly secured to said axle member and an upstanding portion fixedly secured to said first arm member, said first ram being connected to and extending between said lever member and said upstanding portion.

11. The axle assembly according to claim 1 further comprising a sheath disposed between said first arm member and said axle member.

12. The axle assembly according to claim 1 wherein said first ram member is a double acting hydraulic ram.

* * * * *

UNITED STATES PATENT AND TRADEMARK OFFICE
CERTIFICATE OF CORRECTION

PATENT NO. : 6,588,777 B1
DATED : July 8, 2003
INVENTOR(S) : Christopher B. Heyring It is certified that error appears in the above-identified patent and that said Letters Patent is hereby corrected as shown below:

Column 5,
Line 60, after "FIG. 4" insert -- schematically --

Column 6,
Lines 9 and 52, after "support" insert -- a --
Lines 18 and 58, "dispose" should be -- disposed --
Lines 26, 41, 47 and 66, delete "member"

Column 7,
Lines 7 and 10, "claim 1" should be -- claim 5 --
Line 11, "fist" should be -- first --

Column 8,
Lines 1, 8 and 11, "claim 1" should be -- claim 5 --
Line 12, delete "member"

Signed and Sealed this

Ninth Day of March, 2004

JON W. DUDAS
*Acting Director of the United States Patent and Trademark Office*